United States Patent
Horiguchi

(10) Patent No.: US 10,819,879 B2
(45) Date of Patent: Oct. 27, 2020

(54) IMAGE READING DEVICE ALLOWS PLURAL KIND OF SCANNING METHODS USING IMAGE PLURAL READING MODULES TO SEQUENTIALLY ACQUIRE WHITE REFERENCE DATA WHEN COVER MEMBER IS CLOSED

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/203,255

(22) Filed: Nov. 28, 2018

(65) Prior Publication Data

US 2019/0208081 A1 Jul. 4, 2019

(30) Foreign Application Priority Data

Dec. 28, 2017 (JP) ................................ 2017-253418

(51) Int. Cl.
*H04N 1/401* (2006.01)
*H04N 1/00* (2006.01)
*H04N 1/028* (2006.01)
*G06K 9/80* (2006.01)

(52) U.S. Cl.
CPC ......... *H04N 1/401* (2013.01); *H04N 1/00798* (2013.01); *H04N 1/02885* (2013.01); *G06K 9/80* (2013.01); *H04N 2201/0094* (2013.01)

(58) Field of Classification Search
None
See application file for complete search history.

(56) References Cited

U.S. PATENT DOCUMENTS

| 2006/0250661 A1* | 11/2006 | Susaki | H04N 1/401 358/461 |
| 2008/0151331 A1* | 6/2008 | Osakabe | H04N 1/0049 358/498 |
| 2010/0315687 A1* | 12/2010 | Sakane | H04N 1/00002 358/461 |

(Continued)

FOREIGN PATENT DOCUMENTS

JP 2011-077648 A 4/2011

OTHER PUBLICATIONS

Machine Translation in English of JP Pub 2011-077648 to Ishikawa Hiroko.*

*Primary Examiner* — Benny Q Tieu
*Assistant Examiner* — Haris Sabah
(74) *Attorney, Agent, or Firm* — Stein IP, LLC

(57) ABSTRACT

An image reading device includes a document conveying device, a first reading module and a control portion. When initial white reference data, that is, an initial value of white reference data, is acquired, the control portion performs white reference data acquisition processing in a plurality of reading modes sequentially, and if it is judged that the white reference data meets a predetermined condition through data judging processing in all the plurality of reading modes, the acquired initial white reference data is set as usable, and if it is judged that the white reference data does not meet the predetermined condition through data judging processing in at least one of the plurality of reading modes, the acquired initial white reference data is set as unusable.

12 Claims, 5 Drawing Sheets

(56) References Cited

U.S. PATENT DOCUMENTS

| | | | | |
|---|---|---|---|---|
| 2013/0135693 A1* | 5/2013 | Soeda | ............... | H04N 1/00 |
| | | | | 358/474 |
| 2014/0139895 A1* | 5/2014 | Osakabe | ............ | H04N 1/00615 |
| | | | | 358/498 |
| 2016/0119501 A1* | 4/2016 | Kii | ................. | H04N 1/401 |
| | | | | 358/486 |

* cited by examiner

IMAGE READING DEVICE ALLOWS PLURAL KIND OF SCANNING METHODS USING IMAGE PLURAL READING MODULES TO SEQUENTIALLY ACQUIRE WHITE REFERENCE DATA WHEN COVER MEMBER IS CLOSED

INCORPORATION BY REFERENCE

This application is based upon and claims the benefit of priority from the corresponding Japanese Patent Application No. 2017-253418 filed on Dec. 28, 2017, the entire contents of which are incorporated herein by reference.

BACKGROUND

The present disclosure relates to an image reading device that is used in digital copiers, image scanners, and the like to scan and read a document, and to an image forming apparatus provided with one.

Some conventional image reading devices incorporated in multifunction peripherals and the like using an electrophotographic process are provided with a document conveying device (automatic document feeder) that sequentially sends a document in sheet form to a document stage (contact glass) to read it, and discharges it from the document stage after reading it. Such an image reading device allows two kinds of reading methods, namely, a sheet-through method in which a reading module fixed at an image reading position reads a document conveyed automatically by the document conveying device, and a fixed-document method in which, while the document on the document stage is replaced one by one with a document presser opened and closed every time a document is read, the reading module is moved to scan and read the document placed on the document stage.

The recent mainstream of the sheet-through method mentioned above is a double side simultaneous reading method in which the obverse side and the reverse side of a double sided document is simultaneously read in one document conveying operation by the document conveying device using different reading modules respectively. The reading module that reads the reverse side of the double sided document is arranged on the document conveying device. The document conveying device is provided with a cover member with which a part of a document conveying passage can be opened for document jam handling.

The image reading device involves various types of processing needed for, for example, initial setting and adjustment of the reading module. The processing includes initial white reference data acquisition processing where a light source in the reading module is turned on to acquire, as initial white reference data, light quantity data of reflected light from a white reference plate arranged to face the reading module.

On the other hand, in one known image reading device adopting the double side simultaneous reading method, with consideration given to the space inside the document conveying device and convenience in cleaning the reading position, the reading module for reading the reverse side of a double sided document is arranged at where the cover member opens and closes. The white reference plate is fitted on the cover member across the document conveying passage, and when the cover member is opened, the reading module and the white reference plate separate from each other.

In the structure described above, when the cover member is open, even if the light source is on normally, the reading module cannot receive the reflected light from the white reference plate, and this causes erroneous detection that the light source is not on or is on abnormally. Or, even if the light source is off, when the cover member is open, the reading module receives external disturbance light, and thus the error may not be detected.

Another known image reading device judges whether an image can be read based on the result of detecting whether the document conveying device is open or closed with respect to the image reading device as well as the intensity of external light sensed by an external light sensing means.

SUMMARY

According to one aspect of the present disclosure, an image reading device includes a document conveying device, a first reading module, and a control portion. The document conveying device has a document conveying passage through which a conveyed document passes, a cover member with which a predetermined section of the document conveying passage can be opened and closed, and a rotatable white reference roller which is arranged in the cover member and which faces the first reading module when the cover member is closed. The first reading module is arranged inside the document conveying device and can read an image of the conveyed document conveyed by the document conveying device. The first reading module is provided with a light source, and a sensor which reads, as an image light, reflected light of light shone from the light source to the conveyed document. The control portion controls the first reading module. The control portion can perform white reference data acquisition processing which involves sequentially performing first open/closed checking processing for judging whether the cover member is open or closed, data acquisition processing for acquiring white reference data with the sensor by rotating the white reference roller and turning on the light source after the cover member is judged to be closed through first open/closed checking processing, second open/closed checking processing for rechecking whether the cover member is open or closed after white reference data is acquired through data acquisition processing, and data judging processing for judging whether the white reference data meets a predetermined condition after the cover member is judged to be closed through second open/closed checking processing. When initial white reference data, that is, an initial value of white reference data, is acquired, the control portion performs white reference data acquisition processing in a plurality of reading modes sequentially, and if it is judged that the white reference data meets the predetermined condition through data judging processing in all the plurality of reading modes, the acquired initial white reference data is set as usable, and if it is judged that the white reference data does not meet the predetermined condition through data judging processing in at least one of the plurality of reading modes, the acquired initial white reference data is set as unusable.

This and other objects of the present disclosure, and the specific benefits obtained according to the present disclosure, will become apparent from the description of embodiments which follows.

DETAILED DESCRIPTION

Figure 1:
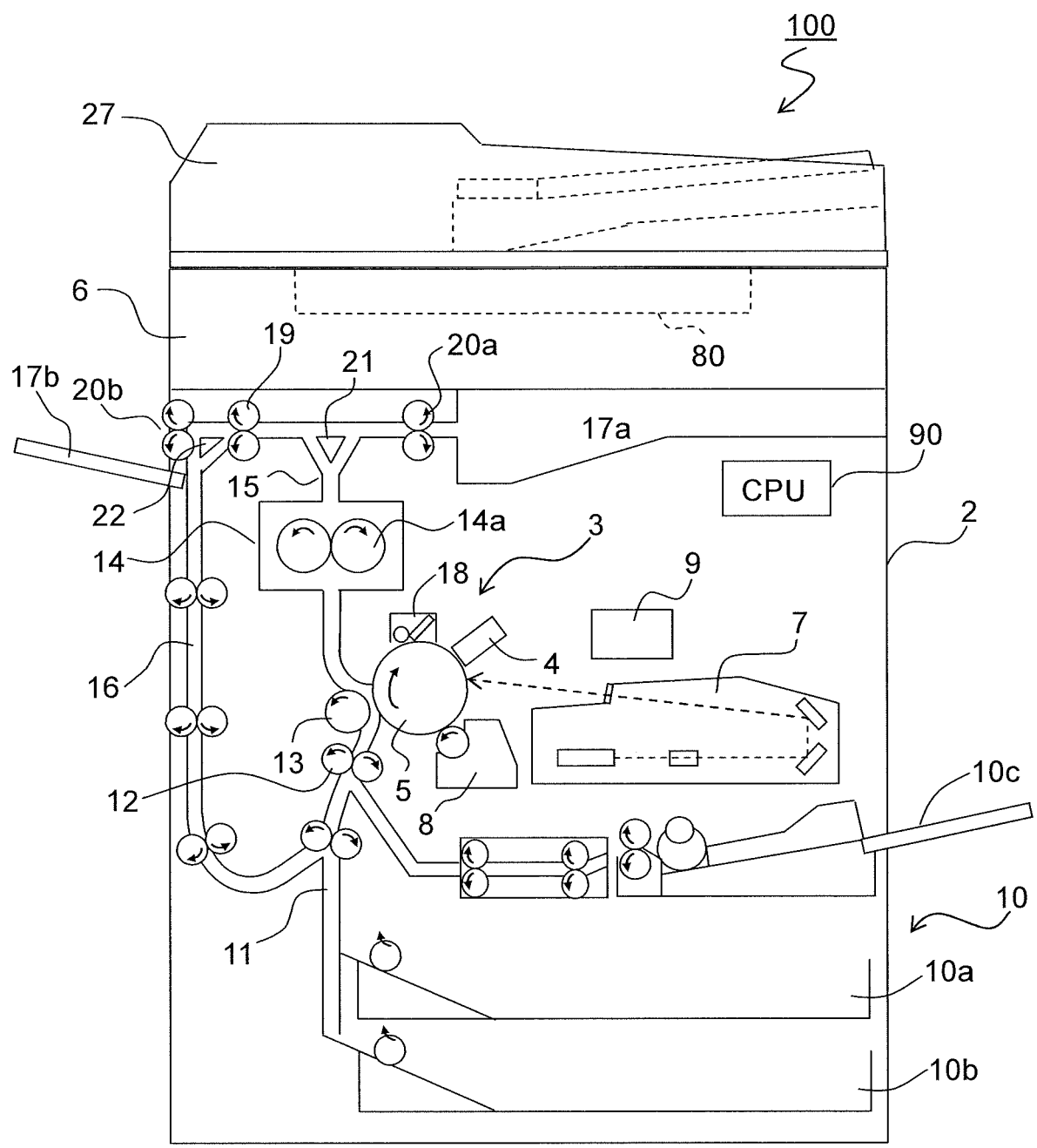
FIG. 1 is a side cross-sectional view showing an overall construction of an image forming apparatus provided with an image reading portion according to the present disclosure.

Hereinafter, with reference to the accompanying drawings, embodiments of the present disclosure will be described. FIG. 1 is a schematic configuration diagram of an image forming apparatus 100 provided with an image reading portion 6 of the present disclosure. In FIG. 1, the image forming apparatus 100 (here, a digital multifunction peripheral is shown as an example), when performing copy operation, reads image data of a document and converts it into a image signal in the image reading portion 6, which will be described later. On the other hand, in an image forming portion 3 in the main body of the multifunction peripheral 2, a photosensitive drum 5 rotating in the clockwise direction in FIG. 1 is electrostatically charged uniformly by an electrical charging unit 4. Then, with a laser beam from an exposure unit (for example, a laser scanning unit) 7, an electrostatic latent image based on document image data that has been read in the image reading portion 6 is formed on the photosensitive drum 5. Developer (hereinafter called toner) is attached to the formed electrostatic latent image by a developing unit 8 to form a toner image. Toner is fed to the developing unit 8 from a toner container 9.

Toward the photosensitive drum 5, where a toner image has now been formed as described above, a sheet is conveyed from a sheet feeding mechanism 10 through a sheet conveying passage 11 via a registration roller pair 12 to the image forming portion 3. The conveyed sheet passes through a nip portion between the photosensitive drum 5 and a transfer roller 13 (an image transfer portion), and thereby the toner image on the surface of the photosensitive drum 5 is transferred to the sheet. The sheet on which the toner image has been transferred is separated from the photosensitive drum 5, and is conveyed to a fixing portion 14 that has a fixing roller pair 14a, where the toner image is fixed on the sheet. The sheet that has passed the fixing portion 14 is conveyed to a sheet conveying passage 15 that branches into a plurality of directions. The sheet has its conveying direction switched by path switching mechanisms 21 and 22 that have a plurality of path switching guides provided at branch points along the sheet conveying passage 15, and is then (or after being conveyed to a reversing conveying passage 16 and having undergone two-sided copying) discharged to a sheet discharge portion comprising a first discharge tray 17a and a second discharge tray 17b.

Although not illustrated, a static eliminator that removes residual electric charges on the surface of the photosensitive drum 5 is provided on the downstream side of a cleaning device 18 in the rotating direction of the photosensitive drum 5. The sheet feeding mechanism 10 includes a plurality of sheet feeding cassettes 10a and 10b that are removably fitted to the main body of the multifunction peripheral 2 to store sheets and a stack bypass (manual feed tray) 10c provided over them. The sheet feeding cassettes 10a and 10b and the stack bypass 10c are connected, through the sheet conveying passage 11, to the image forming portion 3 formed by the photosensitive drum 5, the developing unit 8, and the like.

In an upper part of the main body of the multifunction peripheral 2, the image reading portion 6 is arranged, and on the top face of the multifunction peripheral 2, a document conveying device 27 is provided. The bottom face of the document conveying device 27 serves as a platen (document presser) that presses and holds a document placed on a contact glass 25 (see FIG. 2) of the image reading portion 6. On the front face of the image reading portion 6, an operating portion 80 is provided. The operating portion 80 has a liquid crystal display portion and LEDs to indicate the status of the image forming apparatus 100, and to display the status of image formation, the number of copies, and so on. In the operating portion 80, there are provided, among others, a start button operated by a user to instruct to start image formation, a stop/clear button used, for example, to stop image formation, and a reset button used to bring the different settings in the image forming apparatus 100 back to default states.

The sheet conveying passage 15, specifically, first branches into two, left and right, paths on the downstream side of the fixing roller pair 14a, and one path (the path extending rightward in FIG. 1) communicates with a first discharge tray 17a. The other path (the path extending leftward in FIG. 1), via a conveying roller pair 19, then branches into two paths, and one path (the path extending leftward in FIG. 1) communicates with the second discharge tray 17b. On the other hand, the other path (the path extending downward in FIG. 1) communicates with the reversing conveying passage 16.

In the main body of the multifunction peripheral 2, there is arranged a control portion (CPU) 90 that controls the operation of the image forming portion 3, the image reading portion 6, the document conveying device 27, and the like.

Figure 2:
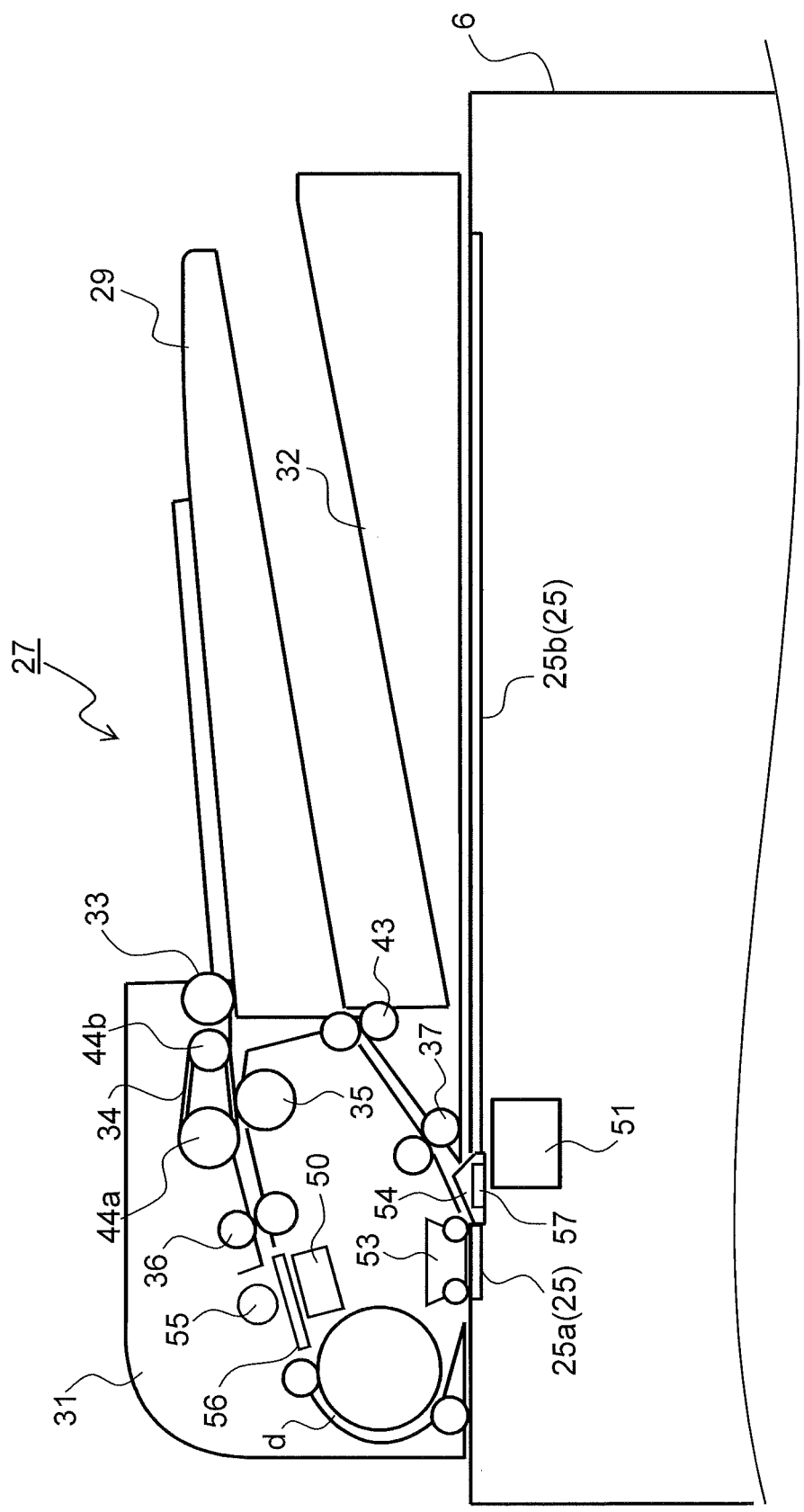
FIG. 2 is a side sectional view showing an internal structure of an image reading portion and a document conveying device that automatically conveys a document to the image reading portion according to one embodiment of the present disclosure.
Figure 3:
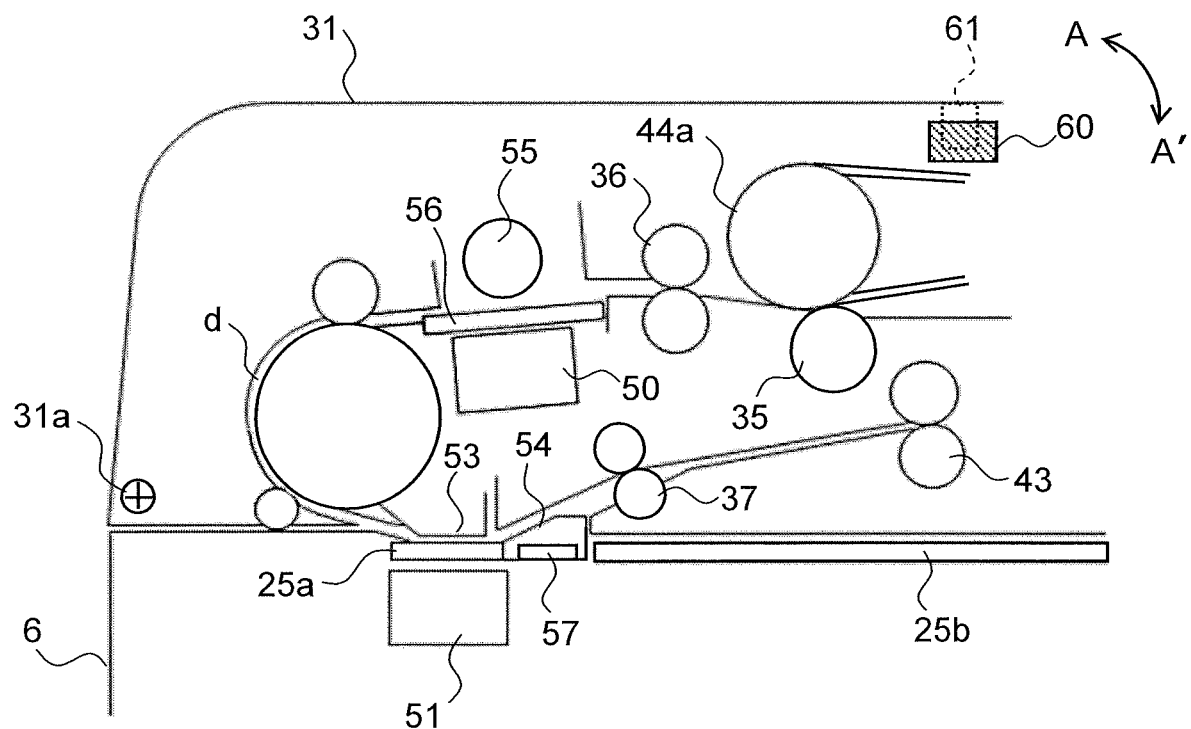
FIG. 3 is a partly enlarged view showing a structure inside a cover member of the document conveying device in FIG. 2.

FIG. 2 is a side sectional view showing the internal structure of the image reading portion 6 and the document conveying device 27 that automatically conveys a document to the image reading portion 6 according to one embodiment of the present disclosure. FIG. 3 is a partly enlarged view of the structure inside a cover member 31 of the document conveying device 27. On the top face of the image reading portion 6, there is arranged the contact glass 25 formed by an automatic reading glass 25a and a manual placement document glass 25b. Between the automatic reading glass 25a and the manual placement document glass 25b, there is arranged a conveying guide 54 that scoops up the leading edge of the document conveyed by the document conveying device 27.

The cover member 31 of the document conveying device 27 is supported so as to be pivotable in the arrow AA' directions relative to a frame (unillustrated) of the document conveying device 27 about, as a pivot, a pivot shaft 31a at a side of the device (on the left side in FIG. 3). In the cover member 31, there is formed a document conveying passage d extending from a document feeding tray 29 to a document discharge tray 32. Along the document conveying passage d, there are provided document conveying members formed by a pick-up roller 33, a sheet feeding belt 34, a separation roller 35, a registration roller pair 36, a conveying roller pair 37, a discharge roller pair 43, and the like, and a reverse side reading module 50 that reads an image on the reverse side of a document.

Adjacent to the reverse side reading module 50, a reverse side reading glass 56 is arranged. The reverse side reading glass 56 constitutes a part of the inner wall face of the document conveying passage d. In a position facing the reverse side reading glass 56 across the document conveying passage d, there is arranged a white reference roller 55 for shading correction in the reverse side reading module 50. The white reference roller 55 is fitted inside the cover member 31 so as to be rotatable by a motor (unillustrated). The white reference roller 55 is arranged, depending on whether the cover member 31 is open or closed, at a position away from the reverse side reading glass 56 or at a position facing the reverse side reading glass 56.

The document conveying path d is curved so as to reverse while leading from the registration roller pair 36 to the automatic reading glass 25a. In the document conveying path d, there are provided, at adequate places, a plurality of sheet detection sensors (unillustrated) including a sheet feeding sensor and a discharge sensor for detecting the presence or passage of a document.

In the cover member 31, an open/closed detection sensor 60 that detects whether the cover member 31 is open or closed is arranged. The open/closed detection sensor 60 is a PI (photointerruptor) sensor provided with a detection portion that has a light emitting portion and a light receiving portion. As shown in FIG. 3, when the cover member 31 is at a closed position, the open/closed detection sensor 60 is shielded from light with a light-shielding plate 61 provided on the cover member 31 side, and a light reception signal level in the detection portion is in a LOW state. When the cover member 31 is pivoted in the opening direction (upward) from the state in FIG. 3, the light-shielding plate 61 retracts upward from the detection portion of the open/closed detection sensor 60, and the light reception signal level turns to a HIGH state. When the light reception signal of the open/closed detection sensor 60 is sent to the control portion 90 (see FIG. 1), whether the cover member 31 is open or closed is detected.

Inside the image reading portion 6, an obverse side reading module 51 is arranged. The obverse side reading module 51 moves in the sub scanning direction (left-right direction in FIG. 2) and meanwhile reads the image of a document placed on the manual placement document glass 25b. The obverse side reading module 51, while staying right under the automatic reading glass 25a, reads an image on the obverse side of a document conveyed by the document conveying device 27. At the bottom of the conveying guide 54, there is arranged a white reference plate 57 for shading correction in the obverse side reading module 51.

Next, document conveying operation by a sheet-through method using the document conveying device 27 will be described. In the sheet-through method, a document comprising a plurality of sheets is set, with the image face up, on the document feeding tray 29. Then, when a copy start button in an operating portion 80 (see FIG. 1) of the image forming apparatus 100 is switched on, a lift plate (unillustrated) raised by a lift mechanism (unillustrated) pushes the pick-up roller 33 up via a document. As a result, the weight of a holder (unillustrated) including the pick-up roller 33 acts on the lift plate and thereby the top face of the document is pressed against the pick-up roller 33 with a predetermined pressure (sheet feeding pressure).

Here, the pick-up roller 33, the driving roller 44a, the driven roller 44b and the sheet feeding belt 34 are arranged on an unillustrated holder. The pick-up roller 33 is coupled to the driving roller 44a by an unillustrated gear. When a roller driving motor (unillustrated) rotates the driving roller 44a, the sheet feeding belt 34 that is stretched around the driving roller 44a and the driven roller 44b is driven to rotate, and the pick-up roller 33 is also driven to rotate.

From the document that is set on the document feeding tray 29, generally a plurality of sheets at the top are fed to the nip portion between the sheet feeding belt 34 and the separation roller 35 by the pick-up roller 33. Then, the separation roller 35 separates only the one topmost sheet from the document comprising a plurality of sheets to convey it toward the registration roller pair 36. Here, after the leading edge of the document is detected by the sheet feeding sensor, the document is conveyed across a predetermined distance. Then the roller driving motor stops so that the pick-up roller 33 and the sheet feeding belt 34 stop being driven to rotate, and thus primary sheet feeding is finished. The primarily fed document, with a sag formed in it, has its leading edge stopped by the nip portion of the registration roller pair 36.

When a predetermined time has passed after the completion of primary sheet feeding, secondary sheet feeding is started. That is, with operation of the secondary sheet feeding motor (unillustrated), the registration roller pair 36 is driven to rotate. The document is conveyed toward the automatic reading glass 25a by the registration roller pair 36 and the conveying roller pair 37. The document conveyed to the automatic reading glass 25a touches a document holding member 53 arranged opposite the automatic reading glass 25a, and is thereby pressed against the automatic reading glass 25a from above. The image on the obverse side (automatic reading glass 25a side) of the document is, through the automatic reading glass 25a, read by the obverse side reading module 51.

The document that has passed the automatic reading glass 25a is, via the conveying guide 54, conveyed toward the conveying roller pair 37 and the discharge roller pair 43, and is finally discharged on the document discharge tray 32 by the discharge roller pair 43. At this time, when the discharge sensor detects the passage of the trailing edge of the document, completion of image reading for one document is detected. Here, the discharge sensor has a counting function for counting the number of documents each time conveyance of a document is complete, and if the sheet feeding sensor detects the following document, the conveyance of the second and the subsequent documents is continued in the same way as described above.

When a double sided document is read, the image on the reverse side of the document is read by the reverse side reading module 50 provided on the upstream side of the document holding member 53, and then the image on the obverse side of the document is read by the obverse side reading module 51.

Figure 4:
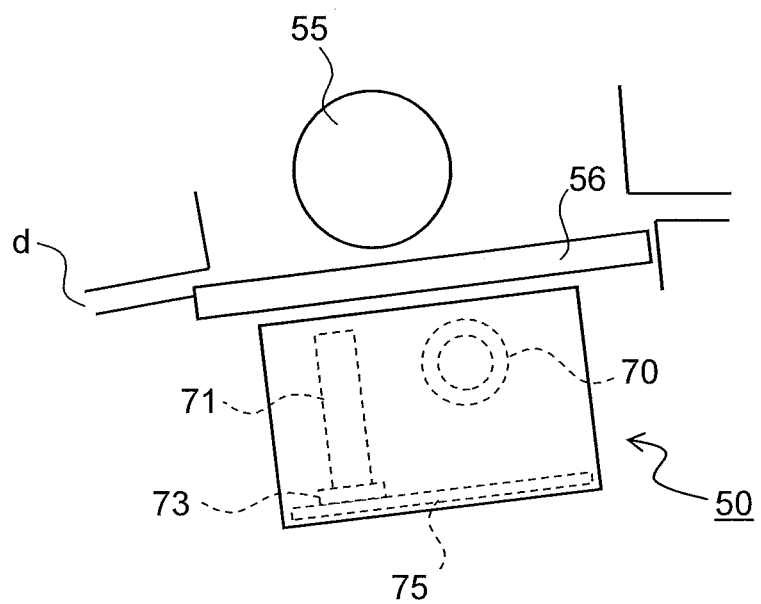
FIG. 4 is a partly enlarged view of and around a reverse side reading module and a white reference roller in FIG. 3.

FIG. 4 is a partly enlarged view of and around the reverse side reading module 50 and the white reference roller 55 in FIG. 3. As shown in FIG. 4, the reverse side reading module 50 is a reading module of a type using a CIS (contact image sensor). Inside the reverse side reading module 50, there is provided a light source 70, a condenser lens 71 comprising a plurality of lenses, and a CMOS (complementary MOS) sensor 73 as a reading means, and the light shone from the light source 70 and having passed through the reverse side reading glass 56 is reflected on a document (unillustrated). The reflected light (image light) reflected on the image face passes through the reverse side reading glass 56 again, is converged by the condenser lens 71 and is focused on the CMOS sensor 73. The focused image light is broken down into pixels in the CMOS sensor 73, and is converted into an electric signal reflecting the density of the individual pixels and thus an image is read. The CMOS sensor 73 is supported on a substrate 75.

Although no overlapping description will be repeated here, also the obverse side reading module 51 (see FIG. 2) is a reading module of a type using a CIS sensor and has, like the reverse side reading module 50, a light source 70, a condenser lens 71, a CMOS sensor 73 and a substrate 75.

Although in the example under discussion the obverse side reading module 51 adopts a reading method using a unity-magnification optical system that employs the CMOS sensor 73 as an image sensor without using a mirror, it is also possible to use a reduction optical system that employs a plurality of mirrors and optical lenses combined with what is called a CCD (charge-coupled device) as an image sensor and that reads a reduced image imaged through the optical lenses.

At various times such as when the image forming apparatus 100 starts to be supplied with power or recovers from a power saving state (a sleep mode), when there has been a predetermined change in temperature or humidity, and when image reading processing is started, processing needed for initial setting or adjustment of the reverse side reading module 50 and the obverse side reading module 51 is performed. The processing includes white reference data acquisition processing where the light source 70 of the reverse side reading module 50 or the obverse side reading module 51 is turned on to acquire white reference data from the white reference roller 55 or the white reference plate 57.

When white reference data acquisition processing in the reverse side reading module 50 is performed, as shown in FIG. 3, the cover member 31 is closed and the white reference roller 55 is arranged to face the reverse side reading glass 56. In this state, while the white reference roller 55 is rotated, the light source 70 is turned on, so that the light shone from a light source 70 is reflected on the white reference roller 55, and then is converged by the condenser lens 71 to be led to the CMOS sensor 73. The output level of the CMOS sensor 73 at this time is acquired as light quantity data (white reference data).

More specifically, while the white reference roller 55 is rotated, the output level of the CMOS sensor 73 is sensed a plurality of times to acquire a plurality of pieces of light quantity data. Then, extremely low values (abnormal values) are excluded, and an average value of usable pieces of light quantity data is calculated. With this, an influence of abnormal data caused by variation in the state of the surface of the white reference roller 55 can be reduced. When the calculated average value of the light quantity data is larger than or equal to a reference value, the white reference data is judged to be usable, and when it is smaller than a reference value, the white reference data is judged not to be usable.

Here, if white reference data acquisition processing is performed with the cover member 31 open, since the white reference roller 55 is away from the reverse side reading glass 56, even if the light source 70 is on normally, the CMOS sensor 73 cannot receive the reflected light from the white reference roller 55, and this causes erroneous detection that the light source 70 is not on. Or, even if the light source 70 is off or is on abnormally, when the cover member 31 is open, the CMOS sensor 73 receives external disturbance light, and thus the error may not be detected.

As described above, whether the cover member 31 is open or closed is detected by detecting whether the optical path of the open/closed detection sensor 60 provided on the document conveying device 27 is open or blocked by the light-shielding plate 61 provided on the cover member 31. Here, due to the approaching or separating strokes between the open/closed detection sensor 60 and the light-shielding plate 61 when the cover member 31 is opened or closed, software-based detection processing, and the like, predetermined detection time is required. On the other hand, white reference data acquisition processing in the reverse side reading module 50 requires shorter checking time because the CMOS sensor 73 is used. Due to this, a time lag arises between the timing of open/closed detection for the cover member 31 and the timing of the start of white reference data acquisition processing, sometimes leading to a situation where, although the cover member 31 has already started to be opened, white reference data acquisition processing is performed on failing to detect that the cover member 31 is open, and this may lead to erroneous detection of the lighting state of the light source 70.

To cope with that, in this embodiment, when white reference data acquisition processing is performed in the reverse side reading module 50, after the cover member 31 is detected to be at a closed position by the open/closed detection sensor 60, the light source 70 is turned on to acquire white reference data. Then, after white reference data acquisition is complete, whether the cover member 31 is at the closed position is detected again, and when it is confirmed that the cover member 31 is at the closed position, whether white reference data is larger than or equal to a reference value is checked.

Figure 5:
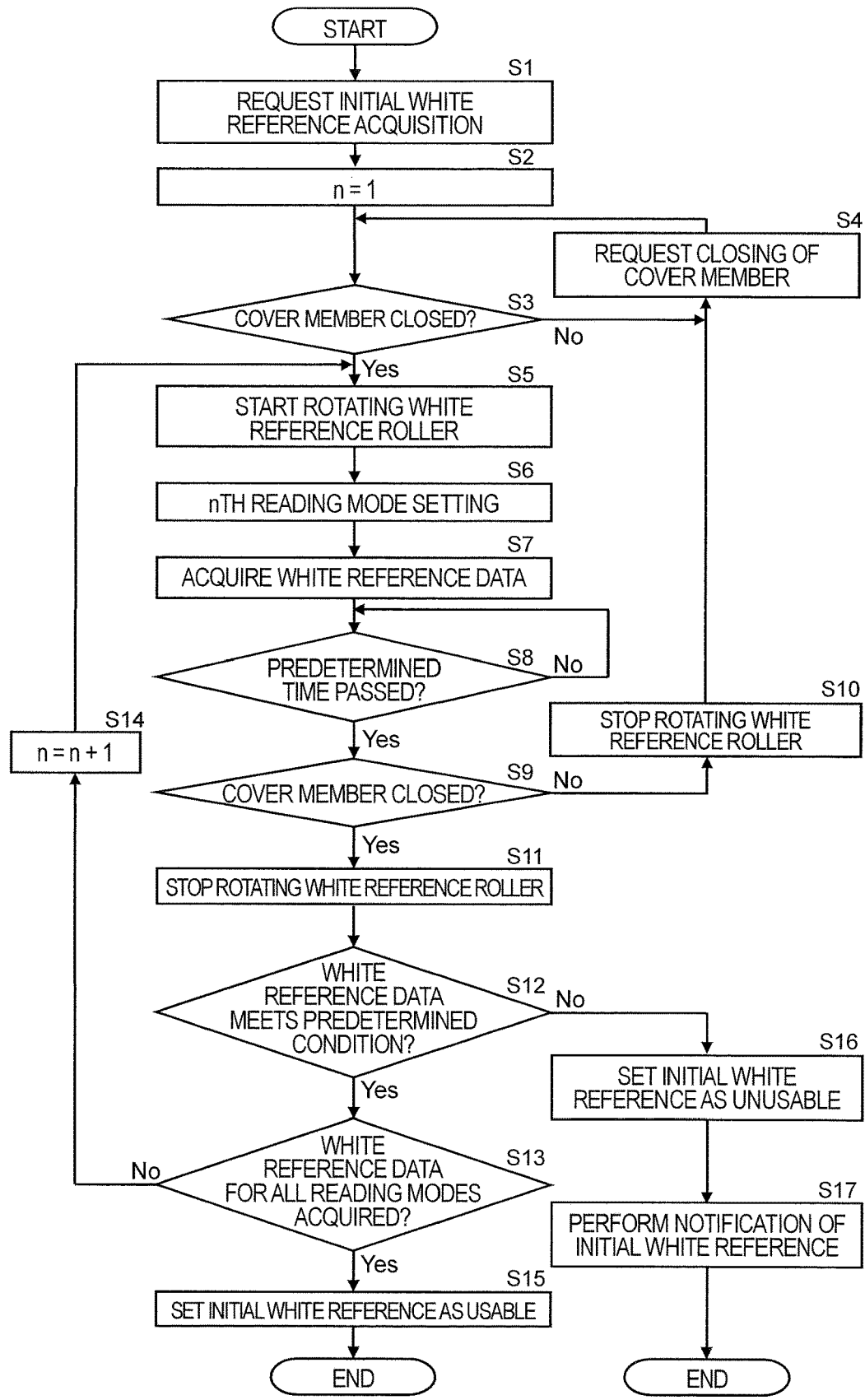
FIG. 5 is a flow chart showing an example of control when, in the document conveying device of this embodiment, white reference data acquisition processing in the reverse side reading module is performed to acquire initial white reference data, that is, an initial value of white reference data.

FIG. 5 is a flow chart showing an example of control when, in the document conveying device 27 of this embodiment, white reference data acquisition processing in the reverse side reading module 50 is performed to acquire initial white reference data, that is, an initial value of white reference data. With reference also to FIGS. 1 to 4 as necessary, the procedure for acquiring initial white reference data will be described along the steps in FIG. 5. Acquisition of initial white reference data is performed on the image forming apparatus 100 in an initial state as when the image forming apparatus 100 is shipped from a factory or is installed at a site of use.

When acquisition of initial white reference data in the reverse side reading module 50 is requested (step S1), the control portion 90 sets a reading mode number n at 1 (step S2). The reading mode refers to, for example, one or combination of a color mode, a monochrome mode, and modes of different resolutions (600 dpi or 300 dpi). This embodiment deals with four kinds of reading modes, namely, a color mode with a resolution of 600 dpi, a color mode with a resolution of 300 dpi, a monochrome mode with a resolution of 600 dpi, and a monochrome mode with a resolution of 300 dpi. These reading modes are assigned different reading numbers 1 to 4 respectively.

Next, the control portion 90 judges, based on a detection signal sent from the open/closed detection sensor 60, whether the cover member 31 is at the closed position or not (step S3, first open/closed checking processing). If the cover member 31 is at the open position (No is step S3), a request to close the cover member 31 is displayed on the liquid crystal display portion in the operating portion 80 (step S4), and the procedure returns to step S3.

If the cover member 31 is at the closed position (Yes in step S3), the control portion 90 starts rotating the white reference roller 55 (step S4). Then, an n-th reading mode (here, the first one, that is, the color mode with a resolution of 600 dpi) is set (step S6), and the light source 70 of the reverse side reading module 50 is turned on to acquire white reference data from the quantity of light that is reflected on the white reference roller 55 to enter the CMOS sensor 73 (step S7, data acquisition processing). Specifically, out of 100 pieces of light quantity data obtained by sensing 100 times the light entering the CMOS sensor 73, a predetermined number (30) of pieces of data with an extremely low light quantity are excluded, and using the remaining (70) pieces of data, an average value is calculated to be taken as white reference data.

Next, after a predetermined time has passed since the acquisition of white reference data (Yes in step S8), the control portion 90 judges again, based on a detection signal sent from the open/closed detection sensor 60, whether the cover member 31 is at the closed position (step S9, second open/closed checking processing). If the cover member 31 is at the open position (No in step S9), the cover member may have been opened during the acquisition of white reference data. Thus, the light source 70 is turned off and the rotation of the white reference roller 55 is stopped (step S10); the procedure then returns to step S4 to request to close the cover member 31, and then returns to step S3 to check whether the cover member 31 is closed, to rotate the white reference roller 55, and to acquire white reference data again (steps S3 to S7).

In step S9, if the cover member 31 is at the closed position (Yes in step S9), the control portion 90 stops rotating the white reference roller 55 (step S11) and then judges whether the white reference data obtained in step S7 meets a prescribed condition, that is, whether the light quantity data is larger than or equal to a reference value (step S12, data judging processing). Then, if the white reference data meets the prescribed condition (Yes in step S12), the control portion 90 judges whether white reference data has been acquired in all the reading modes (step S13).

If there is any reading mode for which white reference data has not been acquired (No in step S13), the reading mode number n is incremented by one (step S14), and the procedure returns to step S5 to repeat white reference data acquisition for the reading modes number 2 to 4 (step S5 to S13). In step S13, if white reference data for all the reading modes has been acquired (Yes in step S13), the white reference data is set as usable (step S15), and the procedure is finished.

On the other hand, if, in step S12, white reference data does not meet the predetermined condition (No in Step S12), the initial white reference data is set as unusable (step S16), a notification indicating abnormal initial white reference data is displayed on the liquid crystal display portion in the operating portion 80 (step S17), and the procedure is finished.

As described above, in the image reading portion 6 of this embodiment, when initial white reference data is acquired in the reverse side reading module 50, it is checked whether the cover member 31 is open or closed before and after the acquisition of white reference data. If the cover member 31 is open before the acquisition of white reference data, white reference data is not acquired and it is requested to close the cover member 31. Also, even if the cover member 31 is closed before the acquisition of white reference data, if the cover member is open after the acquisition of white reference data, data judging processing is not performed, and it is requested to close the cover member 31 to acquire white reference data again. Thus, white reference data can be acquired with the cover member 31 closed reliably and this prevents failure in acquiring white reference data.

By rechecking whether the cover member 31 is closed after the predetermined time has passed since the acquisition of white reference data, even if a certain length of time is required to detect whether the cover member 31 is open or closed, the open/closed state of the cover member 31 can be reliably detected after the acquisition of light quantity data. It is thus possible to more effectively prevent failure in acquiring white reference data.

In the example of control in FIG. 5, after white reference data is acquired (step S7), if the cover member 31 is not closed (No in step S9), the light source 70 is turned off. However, it is also possible to configure to request closing of the cover member 31 with the light source 70 turned on, and after the cover member 31 is confirmed to be closed, to acquire white reference data again.

Figure 6:
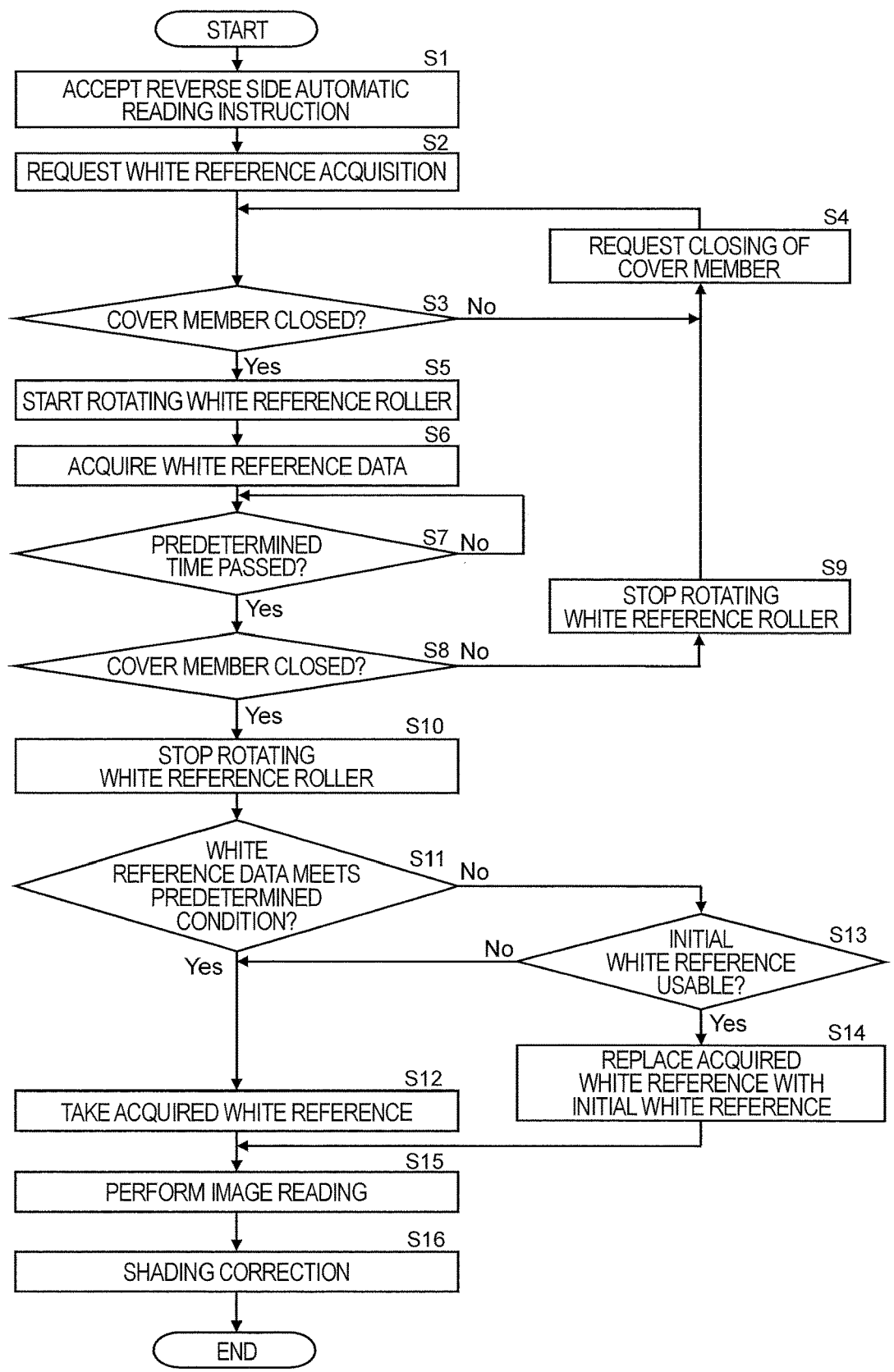
FIG. 6 is a flow chart showing an example of control for performing shading correction during reverse side automatic reading by the reverse side reading module.

FIG. 6 is a flow chart showing an example of control for performing shading correction during the reverse side automatic reading by the reverse side reading module 50. With reference also to FIGS. 1 to 5 as necessary, the procedure for performing shading correction during the reverse side automatic reading will be described along the steps in FIG. 6.

When reverse side automatic reading of a conveyed document by the reverse side reading module 50 is requested (step S1), the control portion 90 requests acquisition of white reference data prior to image reading (step S2). The control portion then checks whether the cover member 31 is at the closed position (Yes in step S3), and starts to rotate the white reference roller 55 (step S5). Thereafter, the steps of acquiring white reference data (step S6), rechecking whether the cover member 31 is closed (step S8), and stopping the rotation of the white reference roller 55 (step S10) are the same as those in the initial white reference data acquisition procedure shown in FIG. 5.

Next, the control portion 90 judges whether the white reference data acquired in step S6 meets the predetermined condition, that is, whether the light quantity data is larger than or equal to the reference value (step S11). Then, if the white reference data meets the predetermined condition (Yes in step S11), the acquired white reference data is taken (step S12).

On the other hand, if the white reference data does not meet the predetermined condition (No in step S11), it is checked whether the initial white reference data acquired through the procedure shown in FIG. 5 is usable (step S13). Then, if the initial white reference data is usable, (Yes in step S13), the acquired white reference data is replaced with the initial white reference data (step S14). On the other hand, if the initial white reference data is not usable (No in step S13), the acquired white reference data is taken (step S12).

Then, image reading by the reverse side reading module 50 is performed (step S15), and shading correction is performed using the white reference data set in step S12 or the initial white reference data after the replacement in step S14 (step S16).

According to the example of control in FIG. 6, if the white reference data acquired prior to image reading does not meet a predetermined condition, and in addition initial white reference data is usable, the acquired white reference data is replaced with the initial white reference data to perform shading correction. With this, even if the white reference roller 55 is soiled or scratched after durability use, it is possible to perform shading correction accurately using initial white reference data. If initial white reference data is unusable, the acquired white reference data is as it is used to perform shading correction, and this prevents failure in image reading resulting from shading correction not being performed.

The embodiment described above is in no way meant to limit the present disclosure, which thus allows for many modifications and variations within the spirit of the present disclosure. For example, although the embodiment described above deals with the image reading device which is composed of the image reading portion 6 and the document conveying device 27, and which has the reverse side reading module 50 arranged inside the document conveying device 27 and the obverse side reading module 51 arranged inside the image reading portion 6, the present disclosure is also applicable similarly to image scanners which have only one reading module corresponding to the reverse side reading module 50 described above and which is used separately from an image forming apparatus 100.

The present disclosure is applicable to image reading devices provided with a reading module arranged inside a document conveying device. Based on the present disclosure, it is possible to provide an image reading device which can prevent erroneous detection caused by the cover member being opened or closed during light source lighting check processing in the reading module, as well as an image forming apparatus provided with such an image reading device.

What is claimed is:

1. An image reading device, comprising:
    a document conveying device which conveys a document;
    a first reading module which is arranged inside the document conveying device and which can read an image of a conveyed document conveyed by the document conveying device; and
    a control portion which controls the first reading module, wherein
    the document conveying device includes
        a document conveying passage through which the conveyed document passes,
        a cover member with which a predetermined section of the document conveying passage can be opened and closed, and
        a white reference roller which is rotatably arranged on the cover member and which faces the first reading module when the cover member is closed,
    the first reading module includes
        a light source, and
        a sensor which reads, as an image light, reflected light of light shone from the light source to the conveyed document, and
    the control portion can, before an instruction to read an image is entered, perform initial white reference data acquisition processing in which initial white reference data that is an initial value of the white reference data is acquired by sequentially performing
        first open/closed checking processing for judging whether the cover member is open or closed,
        data acquisition processing for acquiring white reference data with the sensor by rotating the white reference roller and turning on the light source after the cover member is judged to be closed through the first open/closed checking processing,
        second open/closed checking processing for rechecking whether the cover member is open or closed after the white reference data is acquired through the data acquisition processing, and
        data judging processing for judging whether the white reference data meets a predetermined condition after the cover member is judged to be closed through the second open/closed checking processing,
    when the initial white reference data is acquired, the control portion performs the initial white reference data acquisition processing in a plurality of reading modes sequentially,
    if it is judged that the white reference data meets the predetermined condition through the data judging processing in all the plurality of reading modes, the acquired initial white reference data is set as usable, and if it is judged that the white reference data does not meet the predetermined condition through the data judging processing in at least one of the plurality of reading modes, the acquired initial white reference data is set as unusable,
    the control portion is configured to perform the white reference data acquisition processing before reading an image of the conveyed document using the first reading module and to perform shading correction of a read image using the acquired white reference data, and
    if it is judged that the white reference data does not meet the predetermined condition and in addition the initial white reference data is usable, the shading correction is performed with the white reference data replaced with the initial white reference data, and if it is judged that the white reference data does not meet the predetermined condition and in addition the initial white reference data is unusable, the shading correction is performed using the white reference data.

2. The image reading device according to claim 1, wherein
    when the initial white reference data is acquired, if it is judged that the white reference data meets the predetermined condition in the data judging processing for an nth (n refers to a natural number) reading mode, the control portion performs the white reference data acquisition processing for an (n+1)th reading mode.

3. The image reading device according to claim 1, wherein
    if it is judged that the white reference data does not meet the predetermined condition through the data judging processing in at least one of the plurality of reading modes, the control portion performs notification of an abnormality in the initial white reference data.

4. The image reading device according to claim 1, wherein
    the control portion, a certain length of time after acquiring the white reference data through the data acquisition processing, performs the second open/closed checking processing.

5. The image reading device according to claim 1, wherein
    if it is judged that the cover member is open through the first open/closed checking processing, the control portion performs notification of a request to close the cover member.

6. The image reading device according to claim 1, wherein
    if it is judged that the cover member is open through the second open/closed checking processing, the control portion performs notification of a request to close the cover member, and returns to the first open/closed checking processing to perform the white reference data acquisition processing again.

7. The image reading device according to claim 1, wherein when the white reference data is acquired through the data acquisition processing, the control portion calculates an average value using, out of pieces of light quantity data obtained by sensing predetermined times light entering the sensor, pieces of light quantity data that are left after excluding pieces of light quantity data with light quantity lower than or equal to a predetermined value to take the average value as the white reference data.

8. The image reading device according to claim 1, wherein the first reading module is a contact image sensor.

9. The image reading device according to claim 1, further comprising:

a contact glass fixed on a top face of a scanner frame; and a second reading module arranged below the contact glass so as to be reciprocatable in a sub scanning direction, wherein the first reading module can read an image on a reverse side of the conveyed document, and the second reading module can read an image on an obverse side of a document manually placed on the contact glass while moving in the sub scanning direction, and in addition the second reading module can read, while staying at a reading position, the image on the obverse side of the conveyed document conveyed to a top face of the contact glass by the document conveying device.

10. An image forming apparatus, comprising:

the image reading device according to claim 1; and an image forming portion which forms an image read by the image reading device on a sheet.

11. An image reading device, comprising:

a document conveying device which conveys a document;

a first reading module which is arranged inside the document conveying device and which can read an image of a conveyed document conveyed by the document conveying device; and a control portion which controls the first reading module, wherein the document conveying device includes
  a document conveying passage through which the conveyed document passes,
  a cover member with which a predetermined section of the document conveying passage can be opened and closed, and
  a white reference roller which is rotatably arranged on the cover member and which faces the first reading module when the cover member is closed, the first reading module includes
  a light source, and
  a sensor which reads, as an image light, reflected light of light shone from the light source to the conveyed document, and the control portion can, before an instruction to read an image is entered, perform initial white reference data acquisition processing in which initial white reference data that is an initial value of the white reference data is acquired by sequentially performing
  first open/closed checking processing for judging whether the cover member is open or closed,
  data acquisition processing for acquiring white reference data with the sensor by rotating the white reference roller and turning on the light source after the cover member is judged to be closed through the first open/closed checking processing,
  second open/closed checking processing for rechecking whether the cover member is open or closed after the white reference data is acquired through the data acquisition processing, and
  data judging processing for judging whether the white reference data meets a predetermined condition after the cover member is judged to be closed through the second open/closed checking processing, when the initial white reference data is acquired, the control portion performs the initial white reference data acquisition processing in a plurality of reading modes sequentially, if it is judged that the white reference data meets the predetermined condition through the data judging processing in all the plurality of reading modes, the acquired initial white reference data is set as usable, and if it is judged that the white reference data does not meet the predetermined condition through the data judging processing in at least one of the plurality of reading modes, the acquired initial white reference data is set as unusable, and if it is judged that the cover member is open through the second open/closed checking processing, the control portion performs notification of a request to close the cover member, and returns to the first open/closed checking processing to perform the white reference data acquisition processing again.

12. An image reading device, comprising:

a document conveying device which conveys a document;

a first reading module which is arranged inside the document conveying device and which can read an image of a conveyed document conveyed by the document conveying device; and a control portion which controls the first reading module, wherein the document conveying device includes
  a document conveying passage through which the conveyed document passes,
  a cover member with which a predetermined section of the document conveying passage can be opened and closed, and
  a white reference roller which is rotatably arranged on the cover member and which faces the first reading module when the cover member is closed, the first reading module includes
  a light source, and
  a sensor which reads, as an image light, reflected light of light shone from the light source to the conveyed document, and the control portion can, before an instruction to read an image is entered, perform initial white reference data acquisition processing in which initial white reference data that is an initial value of the white reference data is acquired by sequentially performing
  first open/closed checking processing for judging whether the cover member is open or closed,
  data acquisition processing for acquiring white reference data with the sensor by rotating the white reference roller and turning on the light source after the cover member is judged to be closed through the first open/closed checking processing,
  second open/closed checking processing for rechecking whether the cover member is open or closed after the white reference data is acquired through the data acquisition processing, and
  data judging processing for judging whether the white reference data meets a predetermined condition after the cover member is judged to be closed through the second open/closed checking processing, when the initial white reference data is acquired, the control portion performs the initial white reference data acquisition processing in a plurality of reading modes sequentially, if it is judged that the white reference data meets the predetermined condition through the data judging processing in all the plurality of reading modes, the acquired initial white reference data is set as usable, and if it is judged that the white reference data does not meet the predetermined condition through the data judging processing in at least one of the plurality of reading modes, the acquired initial white reference data is set as unusable, and when the white reference data is acquired through the data acquisition processing, the control portion calculates an average value using, out of pieces of light quantity data obtained by sensing predetermined times light entering the sensor, pieces of light quantity data that are left after excluding pieces of light quantity data with light quantity lower than or equal to a predetermined value to take the average value as the white reference data.

\* \* \* \* \*